(12) United States Patent
Wang et al.

(10) Patent No.: US 10,031,616 B2
(45) Date of Patent: Jul. 24, 2018

(54) TOUCH FEEDBACK CIRCUIT, DRIVING METHOD THEREOF AND TOUCH DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Guangxing Wang, Beijing (CN); Bin Zhang, Beijing (CN); Kan Zhang, Beijing (CN); Dianzheng Dong, Beijing (CN); Qiang Zhang, Beijing (CN); Pengming Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 84 days.

(21) Appl. No.: 15/200,672

(22) Filed: Jul. 1, 2016

(65) Prior Publication Data
US 2017/0192584 A1 Jul. 6, 2017

(30) Foreign Application Priority Data
Jan. 4, 2016 (CN) .......................... 2016 1 0004059

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/016* (2013.01); *G06F 3/041* (2013.01); *G06F 3/044* (2013.01); *G06F 3/045* (2013.01); *G06F 3/0412* (2013.01)

(58) Field of Classification Search
None
See application file for complete search history.

(56) References Cited

U.S. PATENT DOCUMENTS

2012/0306790 A1* 12/2012 Kyung ............... G06F 3/016
345/173
2012/0313862 A1  12/2012 Ko et al.
(Continued)

FOREIGN PATENT DOCUMENTS

CN         2727798       9/2005
CN       102820004 A    12/2012
(Continued)

OTHER PUBLICATIONS

Office action from corresponding Chinese Application No. 201610004059.7, dated Sep. 19, 2016, (8 pages).

*Primary Examiner* — Stephen T Reed
(74) *Attorney, Agent, or Firm* — Harness, Dickey & Pierce, P.L.C.

(57) ABSTRACT

A touch feedback circuit and driving method thereof, and a touch display device are disclosed, so that the user's finger can feel feedback from a touch display, thereby improving the user experience. The touch feedback circuit comprises a deformation element, at least one control module, a control line, a first signal line and a first voltage terminal, wherein the control module is configured to output a signal provided by the first signal line to the deformation element under the control of the control line, the deformation element is configured to deform under the control of the control module and the first voltage terminal, the control line and the first signal line are used to control the deformation element corresponding to a determined touch position. The control module may also include a first to fourth control sub-module, and the touch feedback circuit may also include a first to fourth signal line and first and second voltage (Continued)

terminals, wherein each of the control sub-modules of the control module causes the deformation element to deform more under the control of the control line and the first to fourth signal line. Embodiments of the present disclosure further provide a method for driving the touch feedback circuit and a display device having the touch function.

11 Claims, 6 Drawing Sheets

(51) Int. Cl.
 *G06F 3/01* (2006.01)
 *G06F 3/044* (2006.01)

(56) References Cited

U.S. PATENT DOCUMENTS

| | | | |
|---|---|---|---|
| 2013/0049645 A1* | 2/2013 | Lim | G09G 3/001 318/116 |
| 2014/0366636 A1* | 12/2014 | Ito | G01L 1/005 73/765 |
| 2015/0138104 A1* | 5/2015 | Sugita | G06F 3/016 345/173 |

FOREIGN PATENT DOCUMENTS

| | | |
|---|---|---|
| CN | 104133606 | 11/2014 |
| CN | 104407757 | 3/2015 |
| CN | 104698663 | 6/2015 |
| CN | 105204687 | 12/2015 |

* cited by examiner

TOUCH FEEDBACK CIRCUIT, DRIVING METHOD THEREOF AND TOUCH DISPLAY DEVICE

CROSS-REFERENCE TO RELATED APPLICATION

This application claims the benefit and priority of Chinese Patent Application No. 201610004059.7 filed Jan. 4, 2016. The entire disclosure of the above application is incorporated herein by reference.

FIELD

The present disclosure relates to touch display technologies, and more particularly, to a touch feedback circuit, a driving method thereof and a touch display device.

BACKGROUND

This section provides background information related to the present disclosure which is not necessarily prior art.

With the development of display technologies, touch display technology has been developed rapidly. According to the medium and the operating principle, the touch display can be divided into resistive, capacitive, pressure, infrared and surface-acoustic wave touch display. In an aspect, the capacitive touch display can be classified, according to the touch way, into mutual-capacitive touch display and self-capacitive touch display.

Taking the self-capacitive touch display shown in FIG. 1 as an example, the capacitive touch display has two drive lines and induction lines in each of X, Y directions, all electrodes are both drive electrode and induction electrode, and Sensor Integrated Circuit (Sensor IC) scans capacitance between each electrode and ground (GND), whereby self-capacitance is also known as absolute-capacitance. When user's finger touches the display, the corresponding electrode is connected in parallel with the finger capacitor. When the change in capacitance exceeds a threshold value, Sensor IC records coordinates in both X, Y directions to determine the position of the touch.

However, the existing touch display, when touched, can only determine the position of the touch by transmitting signals in one-way, and is unable to provide feedback from the touch display to the user's finger.

SUMMARY

This section provides a general summary of the disclosure, and is not a comprehensive disclosure of its full scope or all of its features.

Embodiments of the present disclosure provide a touch feedback circuit and driving method thereof and a touch display device.

According to a first aspect of the present disclosure, there is provided a touch feedback circuit. The touch feedback circuit comprises a deformation element, at least one control module, a control line, a first signal line and a first voltage terminal. The control module is connected to the control line, the first signal line and the deformation element, respectively, and is configured to output a signal provided by the first signal line to the deformation element under the control of the control line. The deformation element is connected to the control module and the first voltage terminal, respectively, and is configured to deform under the control of the control module and the first voltage terminal. The control line and the first signal line are used to control the deformation element corresponding to a determined touch position.

In an embodiment of the present disclosure, the deformation element may comprise an IPMC layer.

In an embodiment of the present disclosure, the control module may comprise a first switching element. A control electrode of the first switching element is coupled to the control line, a first electrode of the first switching element is coupled to the first signal line, and a second electrode of the first switching element is coupled to a first terminal of the deformation element. A second terminal of the deformation element is coupled to the first voltage terminal.

According to a second aspect of the present disclosure, there is provided a touch feedback unit comprising the touch feedback circuit described above.

According to a third aspect of the present disclosure, there is provided a touch display device comprising the touch feedback unit described above. The touch display device further comprises a touch unit and a processing unit. The processing unit is connected to the touch unit, and is configured to determine a touch position based on information transmitted by the touch unit. The touch feedback unit is connected to the processing unit, and is configured to perform touch feedback according to the touch position determined by the processing unit.

In an embodiment of the present disclosure, the touch display device may further comprise a display unit arranged in each sub-pixel, wherein the touch feedback circuit described above is arranged in each sub-pixel.

According to a fourth aspect of the present disclosure, there is provided a method for driving the touch feedback circuit described above. In this method, a signal provided by the first signal line is output, by the control module, to the deformation element under the control of the control line, and the deformation element is caused to deform under the control of the control module and the first voltage terminal. The control line and the first signal line are used to control the deformation element corresponding to a determined touch position. The first signal line and the first voltage terminal are at different levels.

In an embodiment of the present disclosure, the method may further comprise: the control module is turned on under the control of the control line, a high level signal provided by the first signal line is output, by the control module, to the deformation element, and the deformation element is caused to deform under the control of the high level signal and the first voltage terminal; the control module is turned off under the control of the control line, and the deformation element is caused to restore to an initial undeformed state; the control module is turned on under the control of the control line, a low level signal provided by the first signal line is output, by the control module, to the deformation element, and the deformation element is caused to deform reversely under the control of the low level signal and the first voltage terminal; the control module is turned off under the control of the control line, and the deformation element is caused to restore to the initial undeformed state. Herein, the level of the first voltage terminal is between the high level and the low level.

According to a fifth aspect of the present disclosure, there is further provided a touch feedback circuit. The touch feedback circuit comprises a deformation element, at least one control module, a control line, a first signal line, a second signal line, a third signal line, a fourth signal line, a first voltage terminal and a second voltage terminal. The control module comprises a first control sub-module, a second control sub-module, a third control sub-module and a fourth control sub-module. The first signal line and the fourth signal line between the first control sub-module and the fourth control sub-module are connected to the second voltage terminal, and the first signal line and the fourth signal line between the second control sub-module and the third control sub-module are connected to the first voltage terminal.

In an embodiment of the present disclosure, the first control sub-module is connected to the control line, the first signal line, the second signal line and a first terminal of the deformation element, respectively, and is configured to output a signal of the second voltage terminal through the first signal line to a first terminal of the deformation element under the control of the control line and the second signal line. The second control sub-module is connected to the control line, the first signal line, the third signal line and the first terminal of the deformation element, respectively, and is configured to output a signal of the first voltage terminal through the first signal line to the first terminal of the deformation element under the control of the control line and the third signal line. The third control sub-module is connected to the control line, the fourth signal line, the second signal line and a second terminal of the deformation element, respectively, and is configured to output a signal of the first voltage terminal through the fourth signal line to the second terminal of the deformation element under the control of the control line and the second signal line. The fourth control sub-module is connected to the control line, the fourth signal line, the third signal line and the second terminal of the deformation element, respectively, and is configured to output a signal of the second voltage terminal through the fourth signal line to the second terminal of the deformation element under the control of the control line and the third signal line.

In an embodiment of the present disclosure, the deformation element may comprise an IPMC layer.

In an embodiment of the present disclosure, the first control sub-module may comprise a second switching element and a third switching element. A control electrode of the second switching element is coupled to the control line, a first electrode of the second switching element is coupled to the second signal line, and a second electrode of the second switching element is coupled to a control electrode of the third switching element. A first electrode of the third switching element is coupled to the first signal line, and a second electrode of the third switching element is coupled to the first terminal of the deformation element.

In an embodiment of the present disclosure, the second control sub-module may comprise a fourth switching element and a fifth switching element. A control electrode of the fourth switching element is coupled to the control line, a first electrode of the fourth switching element is coupled to the third signal line, and a second electrode of the fourth switching element is coupled to a control electrode of the fifth switching element. A first electrode of the fifth switching element is coupled to the first signal line, and a second electrode of the fifth switching element is coupled to the first terminal of the deformation element.

In an embodiment of the present disclosure, the third control sub-module may include a sixth switching element and a seventh switch element. A control electrode of the sixth switching element is coupled to the control line, a first electrode of the sixth switching element is coupled to the second signal line, and a second electrode of the sixth switching element is coupled to a control electrode of the seventh switching element. A first electrode of the seventh switch element is coupled to the fourth signal line, and a second electrode of the seventh switching element is coupled to a second terminal of the deformation element.

In an embodiment of the present disclosure, the fourth control sub-module may include an eighth switching element and a ninth switching element. A control electrode of the eighth switching element is coupled to the control line, a first electrode of the eighth switching element is coupled to the third signal line, and a second electrode of the eighth switching element is coupled to a control electrode of the ninth switching element. A first electrode of the ninth switch element is coupled to the fourth signal line, and a second electrode of the ninth switching element is coupled to a second terminal of the deformation element.

According to a sixth aspect of the present disclosure, there is further provided a touch display unit comprising the touch feedback circuit described above.

According to a seventh aspect of the present disclosure, there is further provided a touch display device comprising the touch feedback unit described above. The touch display device further comprises a touch unit and a processing unit. The processing unit is connected to the touch unit, and is configured to determine a touch position based on information transmitted by the touch unit. The touch feedback unit is connected to the processing unit, and is configured to perform touch feedback according to the touch position determined by the processing unit.

In an embodiment of the present disclosure, the touch display device may further comprise a display unit arranged in each sub-pixel. The touch feedback circuit is arranged in each sub-pixel.

According to an eighth aspect of the present disclosure, there is further provided a method for driving the touch feedback circuit described above. In this method, signals provided by the first voltage terminal and the second voltage terminal are output, by the control module, to the first terminal and the second terminal of the deformation element, respectively, under the control of the control line, the second signal line and the third signal line; and the deformation element is caused to deform under the control of the control module and the first voltage terminal and the second voltage terminal. The control line, the second signal line and the third signal line are used to control the deformation element corresponding to a determined touch position. The first voltage terminal and the second voltage terminal are at different levels.

In an embodiment of the present disclosure, the method further comprises:

the first control sub-module is turned on under the control of the control line and the second signal line, a signal of the second voltage terminal is output, by the first control sub-module, to the first terminal of the deformation element through the first signal line; the third control sub-module is turned on under the control of the control line and the second signal line, a signal of the first voltage terminal is output, by the third control sub-module, to the second voltage terminal of the deformation element through the fourth signal line, the second control sub-module and the fourth control sub-module are turned off under the control of the control line and the third signal line, and the deformation element is caused to deform under the control of the control module, the first voltage terminal and the second voltage terminal;

the first, second, third and fourth control sub-modules of the control module are turned off under the control of the control line;

the second control sub-module is turned on under the control of the control line and the third signal line, a signal of the first voltage terminal is output, by the second control sub-module, to the first terminal of the deformation element through the first signal line, the fourth control sub-module is turned on under the control of the control line and the third signal line, a signal of the second voltage terminal is output, by the fourth control sub-module, to the second terminal of the deformation element through the fourth signal line, the first control sub-module and the third control sub-module are turned off under the control of the control line and the first signal line, and the deformation element is caused to deform under the control of the control module, the first voltage terminal and the second voltage terminal;

The first, second, third and fourth control sub-modules of the control module are turned off under the control of the control line.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

REFERENCE NUMBERS

Figure 1:
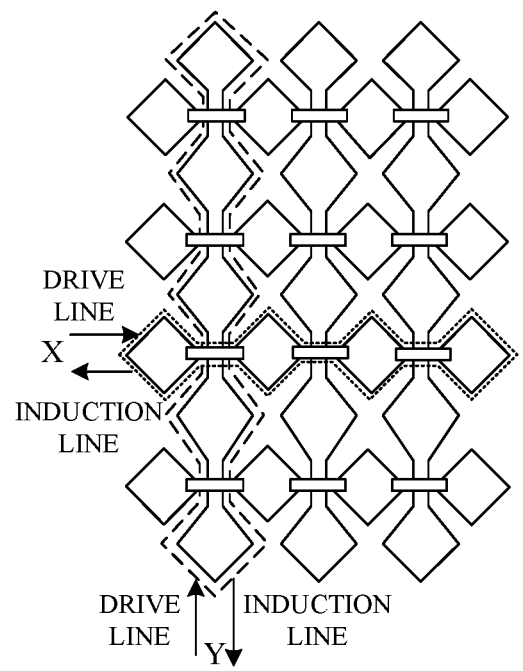
FIG. 1 is a schematic diagram of determining a touch position by using a capacitive touch display in the prior art.

10: control module; 20: deformation element; 110: first control sub-module; 120: second control sub-module; 130: third control sub-module; 140: fourth control sub-module; 30: touch unit; 40: processing unit; 50: touch feedback unit.

DETAILED DESCRIPTION

Example embodiments will now be described more fully with reference to the accompanying drawings.

Those skilled in the art will appreciate that the terms used herein are only for the purpose of describing particular embodiments and are not intended to limit the disclosure. As used herein, the singular forms "a", "an" and "the" are intended to comprise the plural forms as well, unless expressly stated in other cases. It will be further understood when the terms "include", "comprise", "including" and/or "comprising" are used in this specification, they refer to the elements and/or components, but do not exclude the presence or addition of one or more other elements, components and/or combinations thereof.

Unless otherwise defined, all terms (comprising technical and scientific terms) used herein have the same meaning as commonly understood by one of ordinary skills in the art where the disclosed subject matter belongs. It will be further understood that terms, such as those defined in commonly used dictionaries, should be interpreted as meaning consistent with their meanings in the context of the specification and the related art, and will not be interpreted in an idealized or overly formal sense, unless otherwise explicitly defined herein. "First", "second", "third", "fourth" and similar terms used in this disclosure do not denote any order, quantity, or importance, but are used to distinguish different components only. As used herein, the statement "connecting" or "coupling" two or more parts together shall mean that the parts are joined together or joined through one or more intermediate parts.

In all embodiments of the present disclosure, the switching elements employed are illustrated by example of N-type (MOS) field effect transistor (FET), and also may adopt P-type FETs, and P-type or N-type bipolar transistors to implement the functions of the switching elements. Since source and drain of a transistor (emitter and collector) are symmetrical, and a P-type transistor and a N-type transistor have opposite directions of conduction current between source and drain (emitter and collector), in the embodiments of the present disclosure, it is specified that a controlled intermediate terminal of a transistor is the gate, a signal input terminal is the source, and a signal output terminal is the drain. Further, any controlled switching device with gating signal input may be adopted to implement the functions of the switching elements, the controlled intermediate terminal of the switching device for receiving a control signal (for example, for turning on and off the controlled switching device) being called a control electrode, the signal input terminal being called the first electrode, and the signal output terminal being called the second electrode. The transistors employed in the embodiments of the present disclosure are primarily switching transistors.

Figure 2:
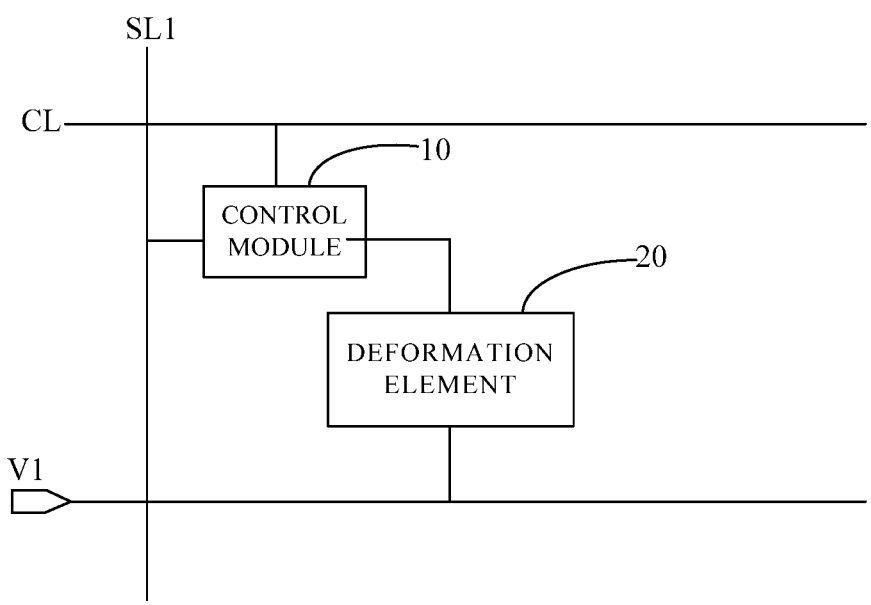
FIG. 2 is an exemplary block diagram of a touch feedback circuit according to an embodiment of the present disclosure.

The touch feedback circuit according to an embodiment of the present disclosure, as shown in FIG. 2, is arranged to perform touch feedback according to a determined position. The touch feedback circuit comprises a deformation element 20, at least one control module 10, a control line CL, a first signal line SL1 and a first voltage terminal V1. The control module 10 is connected to the control line CL, the first signal line SL1 and the deformation element 20, respectively, and is configured to output a signal provided by the first signal line SL1 to the deformation element 20 under the control of the control line CL. The deformation element 20 is connected to the control module 10 and the first voltage terminal V1, respectively, and is configured to deform under the control of the control module 10 and the first voltage terminal V1. In this way, the control line CL and the first signal line SL1 are used to control the deformation element 20 corresponding to the determined touch position.

Here, the present disclosure does not limit to the structure of the touch circuit based on the determined touch position and the touch method corresponding to the touch circuit structure. For example, the touch display according to the present disclosure may employ self-capacitive touch display or mutual-capacitive touch display. The present disclosure also does not limit the structure of the deformation element 20. The deformation element 20 can deform correspondingly according to a different voltage applied at both terminals thereof, and can restore to the initial state when no voltage is applied. Further, the present disclosure does not limit the voltage of the first voltage terminal V1. The voltage of the first voltage terminal V1 should have a non-zero voltage difference from the signal voltage provided by the first signal line SL1, e.g., the first voltage terminal V1 can be the ground terminal, and can also be the terminal providing a negative voltage.

Since the touch feedback circuit of the present disclosure is a touch feedback for the determined touch position, those skilled in the art should understand that, under the control of the control line CL, only the deformation element 20 corresponding to the touch position (for example, at the touch position) can receive a signal outputted by the first signal line SL1, and at this time, under the control of the first voltage terminal V1, the deformation element 20 corresponding to the touch position can be caused to deform.

In the disclosed embodiment, when the user touches the display, based on the determined touch position, under the control of the control line CL, the first signal line SL1 provides a signal voltage for the first terminal of the deformation element 20 at the touch position, and the first voltage terminal V1 applies a voltage different from the signal voltage to the second terminal of the deformation element 20. The deformation element 20 deforms correspondingly based on the different voltages at the two sides, so that the user's finger feels feedback from the touch display, thereby improving the user experience.

IPMC (Ionic polymer metal composite) can deform sensitively according to the voltage applied thereon, and therefore the deformation element 20 according to the embodiment of the present disclosure contains IPMC material (for example, an IPMC layer is formed with IPMC).

Figure 3A:
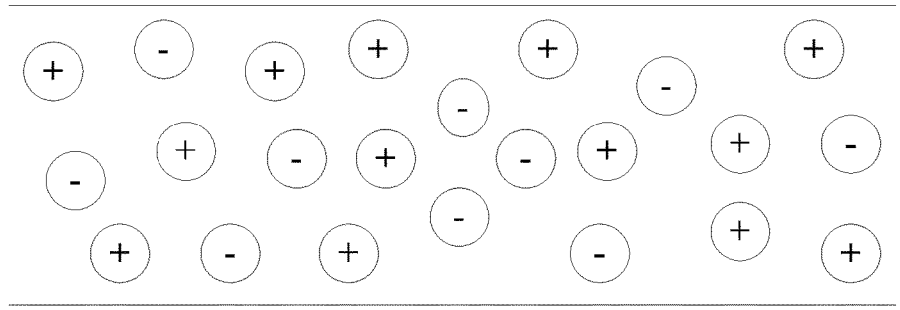
FIG. 3a is a schematic structural diagram of IPMC without voltage applied according to an embodiment of the present disclosure.
Figure 3B:
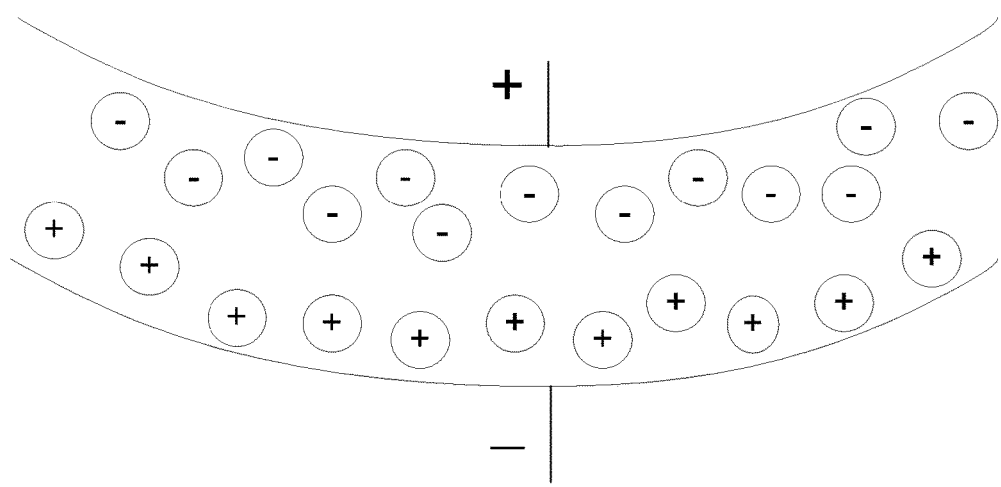
FIG. 3b is a schematic structural diagram of IPMC with voltage applied according to the embodiment of the present disclosure.

In a schematic structural diagram of IPMC without voltage applied shown in FIG. 3A, when no voltage is applied to the IPMC layer, the IPMC layer is flat. In a schematic structural diagram of IPMC with voltage applied shown in FIG. 3B, when different voltages are applied at the two sides of the IPMC layer, hydrated cations (+) in the IPMC layer migrate to the low voltage side of the IPMC layer, and anions (−) migrate to the high voltage side of the IPMC layer. Therefore, the low voltage side of the IPMC layer expands, while the high voltage side of the IPMC layer shrinks, so that the IPMC layer bends.

The degree of bending of the IPMC layer is related to the voltage applied at the two sides thereof. In the disclosed embodiment, that is, it is related to the signal voltage across the IPMC layer provided by the first signal line SL1, and the voltage applied by the first voltage terminal V1. The greater the voltage difference therebetween is, the greater the degree of bending of the IPMC layer would be; the smaller the voltage difference therebetween is, the smaller the degree of bending of the IPMC layer would be. Moreover, the IPMC layer always bends toward the low voltage side of the IPMC layer.

Since the touch occurs at the display area of the touch display device, the touch feedback should also be performed at the corresponding position in the display area, whereby the IPMC layer has to be provided in the display area and the IPMC layer should be transparent so as not to affect the display of the touch display device.

Figure 4:
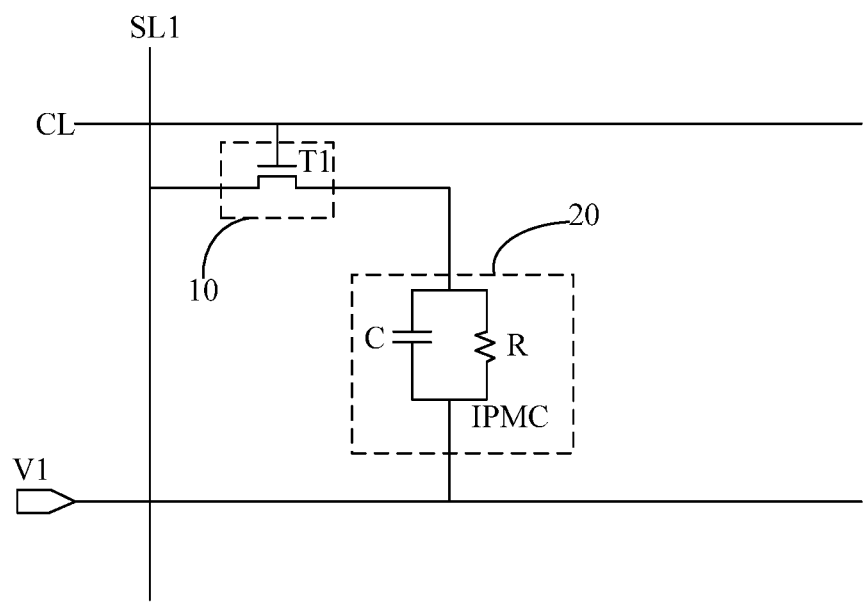
FIG. 4 is an exemplary circuit of the touch feedback circuit according to the embodiment of the present disclosure.

FIG. 4 shows an exemplary circuit of the touch feedback circuit according to the embodiment of the present disclosure. The control module 10 comprises a first switching element T1, wherein the control electrode of T1 is coupled to the control line CL, the first electrode of T1 is coupled to the first signal line SL1, the second electrode of T1 is coupled to the first terminal of the deformation element 20. The second terminal of the deformation element 20 is coupled to the first voltage terminal V1. The control module 10 may also include a plurality of switching elements connected with the first switching element T1 in parallel. The control module 10 may also use other structures with same functions.

When the deformation element 20 is the IPMC layer, since its two sides are conductors in the direction of thickness of the IPMC layer, while the resistance of the intermediate part is high, the deformation element 20 is equivalent to a parallel circuit composed of a capacitor C and a resistor R.

The operation of the touch feedback circuit shown in FIG. 4 is as follows: when the signal inputted via the control line CL to the control electrode of the first switching element T1 is at high level, the first switching element T1 is turned on, and the high-level signal can be outputted to the first side of the IPMC layer. The first voltage terminal V1 applies voltage to the second side of the IPMC layer. When the first voltage terminal V1 is connected to the ground, the second terminal of the IPMC layer is grounded, so that there is a voltage difference between the two sides, whereby, according to the magnitude of the voltage difference across the IPMC layer, the IPMC layer deforms at different degrees.

Figure 5:
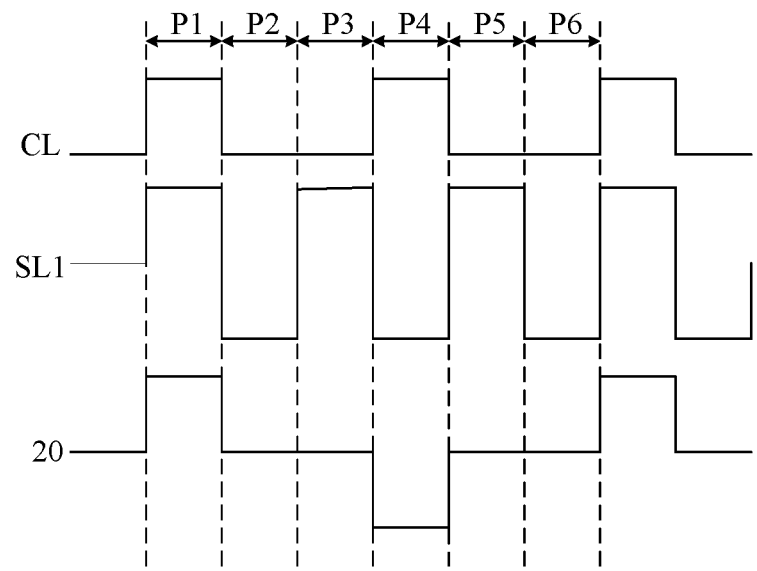
FIG. 5 is a timing chart of driving the touch feedback circuit according to the embodiment of the present disclosure.

FIG. 5 is a timing chart of the touch feedback circuit according to the embodiment of the present disclosure. A driving method for the touch feedback circuit shown in FIG. 4 comprises:

step S101: in a first phase P1, the control line CL outputs a high-level signal to turn on the first switching element T1, and the control module 10 is turned on under the control of the control line CL; a positive high-level signal provided by the first signal line SL1 is outputted via T1 to the first terminal U1 of the IPMC layer, the first voltage terminal V1 connected with the second terminal U2 of the IPMC layer is grounded, and the IPMC layer of the deformation element 20 bends toward the second terminal U2, under the control of the positive high level signal provided by the first signal line SL1 and the zero level signal applied by the first voltage terminal V1, and deforms;

step S102: in a second phase P2 and a third phase P3, a low level signal outputted by the control line CL turns off the first switching element T1, and the control module 10 is turned off under the control of the control line CL; a signal outputted by the first signal line SL1 cannot be outputted to the deformation element 20; since the first voltage terminal V1 connected with the second terminal U2 of the IPMC layer of the deformation element 20 is grounded, the charge stored inside the IPMC layer in the first phase P1 is rapidly discharged; in the second phase P2 and the third phase P3, voltages at both sides of the IPMC layer of the deformation element 20 are zero, and the deformation element 20 is restored to the initial undeformed state;

step S103: in a fourth phase P4, a high-level signal outputted by the control line CL turns on the first switching element T1, and the control module 10 is turned on under the control of the control line CL; a negative low level signal provided by the first signal line SL1 is outputted via T1 to the first terminal U1 of the IPMC layer of the deformation element 20, the first voltage terminal V1 connected with the second terminal U2 of the IPMC layer is grounded, at the time the voltage difference between the two sides of the IPMC layer of the deformation element 20 is in reverse to the voltage difference between the two sides of the IPMC layer of the deformation element 20 in the first phase P1, and the IPMC layer of the deformation element 20 bends toward the second terminal U2 under the control of the negative low level signal provided by the first signal line SL1 and the zero level signal applied by the first voltage terminal V1, and deforms;

step S104: in a fifth phase P5 and a sixth phase P6, a low level signal outputted by the control line CL turns off the first switching element T1, and the control module 10 is turned off under the control of the control line CL; similar to the second phase P2 and the third stage P3, the charge stored inside the IPMC layer in the fourth phase P4 is rapidly discharged; in the fifth phase P5 and the sixth phase P6, voltages at both sides of the IPMC layer of the deformation element 20 are zero, and the deformation element 20 is restored to the initial undeformed state;

repeating the above steps S101 to S104.

It should be noted that, the positive high level and the negative low level in the embodiment of the present disclosure are relative to the zero level, but the high level and the low level are relative to each other, regardless of the zero level.

Figure 6:
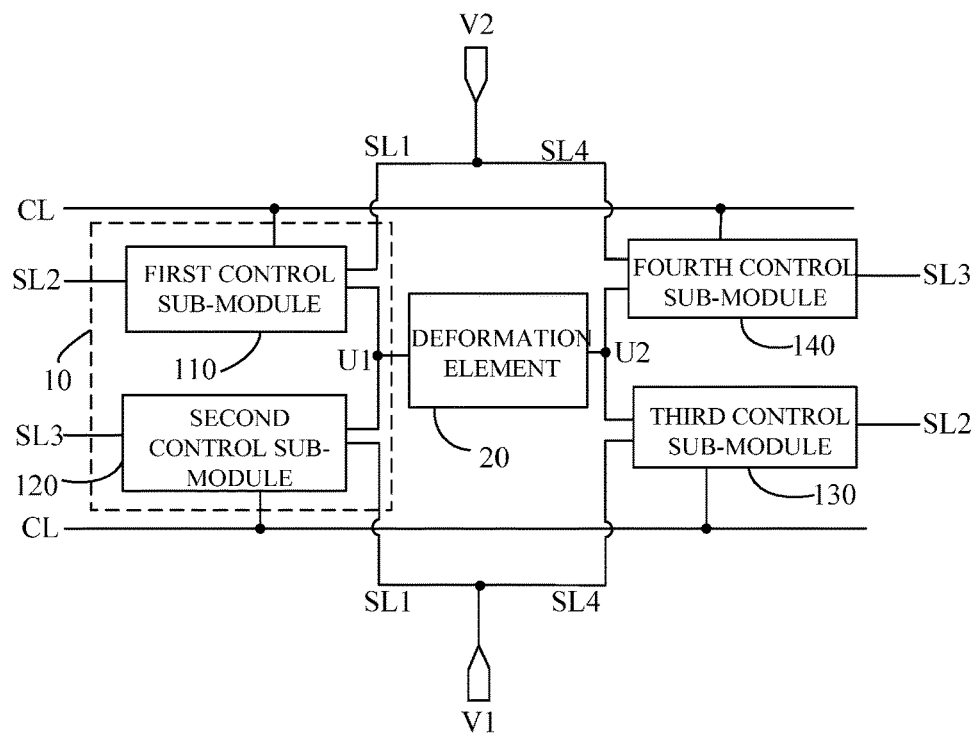
FIG. 6 is an exemplary block diagram of the touch feedback circuit according to a further embodiment of the present disclosure.

FIG. 6 is an exemplary circuit of the touch feedback circuit according to a further embodiment of the present disclosure. The touch feedback circuit comprises a control module 10, a deformation element 20, a control line CL, a first signal line SL1, a second signal line SL2, a third signal line SL3, a fourth signal line SL4, a first voltage terminal V1 and a second voltage terminal V2. The first signal line SL1 and the fourth signal line SL4 are connected to the first voltage terminal V1 in one end, and the first signal line SL1 and the fourth signal line SL4 are connected to the second voltage terminal V2 in the other end.

The control module 10 includes a first control sub-module 110, a second control sub-module 120, a third control sub-module 130 and a fourth control sub-module 140. The first control sub-module 110 is connected to the control line CL, the first signal line SL1, the second signal line SL2 and the first terminal U1 of the deformation element 20, respectively, and is configured to output a signal of the second voltage terminal V2 through the first signal line SL1 to the first terminal U1 of the deformation element 20 under the control of the control line CL and the second signal line SL2.

The second control sub-module 120 is connected to the control line CL, the first signal line SL1, the third signal line SL3 and the first terminal U1 of the deformation element 20, respectively, and is configured to output a signal of the first voltage terminal V1 through the first signal line SL1 to the first terminal U1 of the deformation element 20 under the control of the control line CL and the third signal line SL3.

The third control sub-module 130 is connected to the control line CL, the fourth signal line SL4, the second signal line SL2 and the second terminal U2 of the deformation element 20, respectively, and is configured to output a signal of the first voltage terminal V1 through the fourth signal line SL4 to the second terminal U2 of the deformation element 20 under the control of the control line CL and the second signal line SL2.

The fourth control sub-module 140 is connected to the control line CL, the fourth signal line SL4, the third signal line SL3 and the second terminal U2 of the deformation element 20, respectively, and is configured to output a signal of the second voltage terminal V2 through the fourth signal line SL4 to the second terminal U2 of the deformation element 20 under the control of the control line CL and the third signal line SL3.

According to a further embodiment of the present disclosure, through the first control sub-module 110 and the second control sub-module 120, under the control of the control line CL and the second signal line SL2 and the third signal line SL3, the first terminal U1 of the deformation element 20 may only receive a signal (e.g., a positive high level signal) provided by the second voltage terminal V2 at a first moment, and only receive a signal (e.g., a negative low level signal) provided by the first voltage terminal V1 at a second moment.

Further, through the third control sub-module 130 and the fourth control sub-module 140, under the control of the control line CL and the second signal line SL2 and the third signal line SL3, the second terminal U2 of the deformation element 20 may only receive a signal (e.g., a negative low level signal) provided by the first voltage terminal V1 at the first moment, and only receive a signal (e.g., a positive high level signal) provided by the second voltage terminal V2 at the second moment.

Thus, whether at the first moment or at the second moment, there is a voltage difference between the two terminals of the deformation element 20, and therefore the deformation element 20 will deform; due to the voltage difference between the two terminals of the deformation element 20 are in opposite polarity at the first moment and at the second time, it is possible to control the voltage difference between the two terminals of the deformation element 20 to change alternatively in opposite polarity at two adjacent moments, so that the deformation of the deformation element 20 alternates at two adjacent moments from a forward deformation to a reverse deformation, thus resulting in a larger deformation amplitude, to provide a stronger touch feedback experience to the user.

Figure 7:
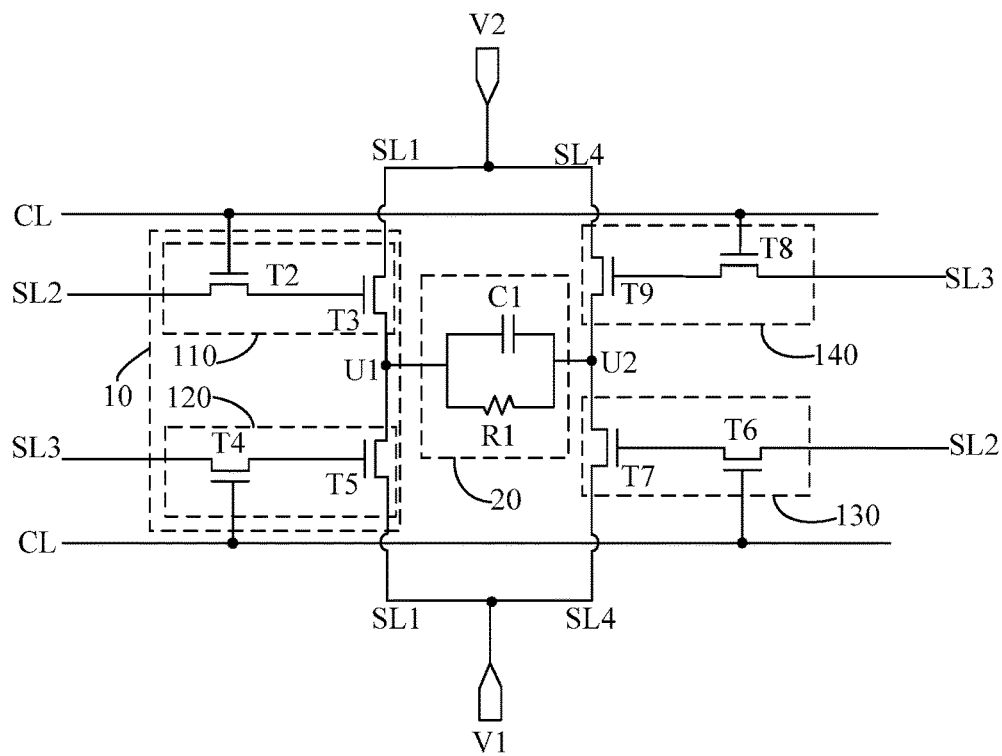
FIG. 7 is an exemplary circuit of the touch feedback circuit according to a further embodiment of the present disclosure.

FIG. 7 shows an exemplary circuit of the touch feedback circuit according to a further embodiment of the present disclosure. Wherein, the first control sub-module 110 includes a second switching element T2 and a third switching element T3. The control electrode of the second switching element T2 is coupled to the control line CL, the first electrode of T2 is coupled to the second signal line SL2, and the second electrode of T2 is coupled to the control electrode of the third switching element T3; the first electrode of the third switching element T3 is coupled to the first signal line SL1, and the second electrode of T3 is coupled to the first terminal U1 of the deformation element 20.

The second control sub-module 120 comprises a fourth switching element T4 and a fifth switching element T5. The control electrode of the fourth switching element T4 is coupled to the control line CL, the first electrode of T4 is coupled to the third signal line SL3, and the second electrode of T4 is coupled to the control electrode of the fifth switching element T5. The first electrode of the fifth switching element T5 is coupled to the first signal line SL1, and the second electrode of T5 is coupled to the first terminal U1 of the deformation element 20.

The third control sub-module 130 includes a sixth switching element T6 and a seventh switch element T7. The control electrode of the sixth switching element T6 is coupled to the control line CL, the first electrode of T6 is coupled to the second signal line SL2, and the second electrode of T6 is coupled to the control electrode of the seventh switching element T7. The first electrode of the seventh switch element T7 is coupled to the fourth signal line SL4, and the second electrode of T7 is coupled to a second terminal U2 of the deformation element 20.

The fourth control sub-module 140 includes an eighth switching element T8 and a ninth switching element T9. The control electrode of the eighth switching element T8 is coupled to the control line CL, the first electrode of T8 is coupled to the third signal line SL3, and the second electrode of T8 is coupled to the control electrode of the ninth switching element T9. The first electrode of the ninth switching element T9 is coupled to the fourth signal line SL4, and the second electrode of T9 is coupled to the second terminal U2 of the deformation element 20.

It should be noted that the first control sub-module 110 may also include a plurality of switching elements connected in parallel with the second switching element T2. Similarly, the second control sub-module 120 may further include a plurality of switching elements connected in parallel with the fourth switching element T4. The third control sub-module 130 may also include a plurality of switching elements connected in parallel with the sixth switching element T6. The fourth control sub-module 140 may also include a plurality of switching elements connected in parallel with the eighth switching element T8. The various control sub-modules in the control module 10 according to the disclosed embodiment can also use other structures with the same functions.

The circuit structure of the deformation element 20 is similar to FIG. 4, and is equivalent to a parallel circuit composed of a capacitor C and a resistor R.

The first signal line SL1 and the fourth signal line SL4 between the first control sub-module 110 and the fourth control sub-module 140 are connected in parallel with the second voltage terminal V2, and the second signal line SL1 and the fourth signal line SL4 between the second control sub-module 120 and the third control sub-module 130 are connected in parallel with the first voltage terminal V1.

The operation of the touch feedback circuit shown in FIG. 7 is as follows:

at the first moment, when a high-level signal is inputted to the control line CL and the second signal line SL2, the second switching element T2 is turned on, the high-level signal of the second signal line SL2 may be outputted to the control electrode of the third switching element T3 to turn on the third switching element T3, and a voltage level provided by the second voltage terminal V2 is outputted through the first signal line SL1 to the first terminal U1 of the IPMC layer. In this way, the sixth switching element T6 is also turned on, the high level signal outputted by the second signal line SL2 is outputted to the control electrode of the seventh switching element T7 to turn on the seventh switching element T7, and a voltage level provided by the first voltage terminal V1 is outputted through the fourth signal line SL4 to the second terminal U2 of the IPMC layer. When there is a voltage difference between the first terminal U1 and the second terminal U2 of the IPMC layer, i.e., a voltage level difference between the second voltage terminal V2 and the first voltage terminal V1, the IPMC layer will deform. For example, if the level of the second voltage terminal V2 is higher than the level of the first voltage terminal V1, then the IPMC layer bends toward the second terminal U2.

At the second moment, when a high-level signal is inputted to the control line CL and the third signal line SL3, the fourth switching element T4 is turned on, the high-level signal outputted by the third signal line SL3 is outputted to the control electrode of the fifth switching element T5 to turn on the fifth switching element T5, and a voltage level provided by the first voltage terminal V1 is outputted through the first signal line SL1 to the first terminal U1 of the IPMC layer. Meanwhile, the eighth switching element T8 is also turned on, the high level signal outputted by the third signal line SL3 is outputted to the control electrode of the ninth switching element T9 to turn on the ninth switching element T9, and a voltage level provided by the second voltage terminal V2 is outputted through the fourth signal line SL4 to the second terminal U2 of the IPMC layer. If the level of the second voltage terminal V2 is higher than the level of the first voltage terminal V1, the IPMC layer bends toward the first terminal U1.

Signals at the first moment and the second moment are alternately inputted, causing the deformation of the IPMC layer to directly change between bending toward the second terminal U2 and bending toward the first terminal U1, without restoring from the bending to the initial undeformed state, such that the deformation degree of the IPMC layer is greater.

Figure 8:
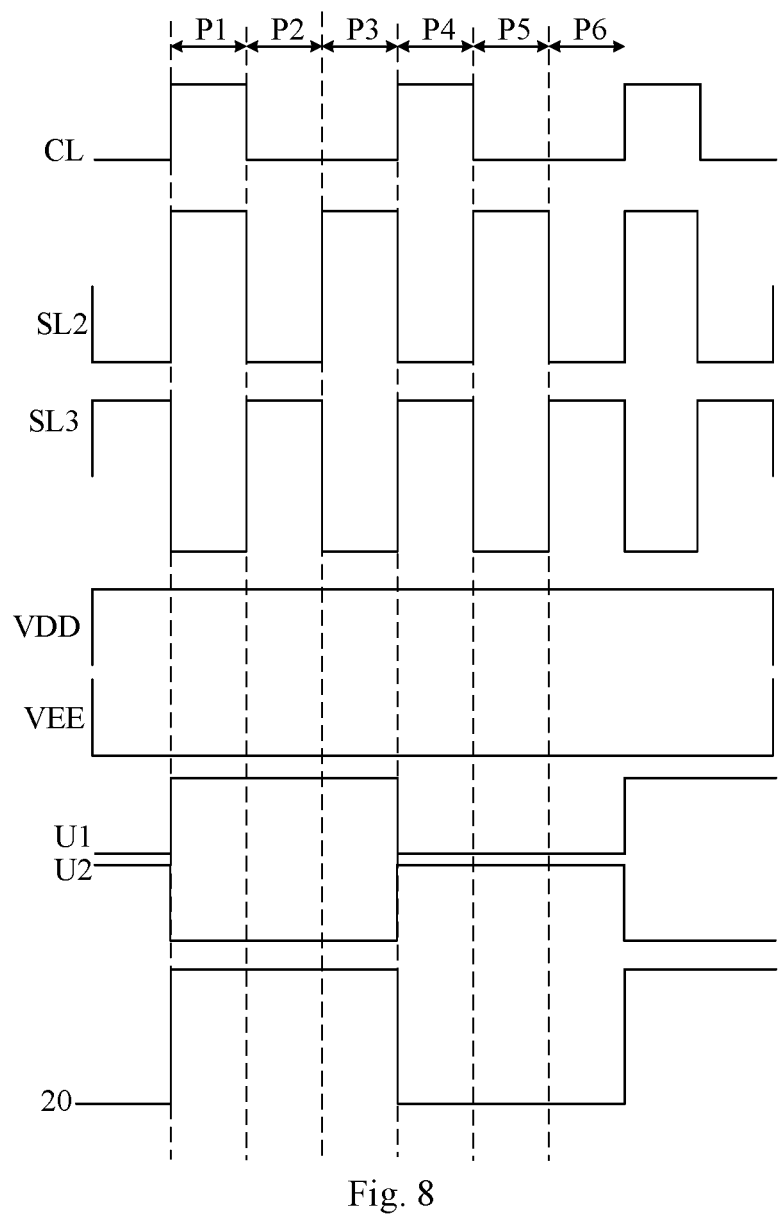
FIG. 8 is a timing chart of driving the touch feedback circuit according to the further embodiment of the present disclosure.

FIG. 8 is a timing chart of the touch feedback circuit according to the further embodiment of the present disclosure. The driving method for the touch feedback circuit shown in FIG. 7 comprises the following steps.

Step S201: in the first phase P1, the control line CL and the second signal line SL2 output a high-level signal, the second switching element T2, the third switching element T3, the sixth switching element T6 and the seventh switching element T7 are turned on, the first control sub-module 110 and the third control sub-module 130 are turned on under the control of the control line CL and the second signal line SL2; a positive high level voltage VDD provided by the second voltage terminal V2 is outputted through the first signal line SL1 to the first terminal U1 of the IPMC layer of the deformation element 20, a negative low level voltage VEE provided by the first voltage terminal V1 is outputted through the fourth signal line SL4 to the second terminal U2 of the IPMC layer of the deformation element 20, the IPMC layer bends toward the second terminal U2 at low-level under the control of the positive high level voltage VDD and the negative low level voltage VEE; compared to the touch feedback circuit shown in FIG. 4, the negative low level of the second terminal U2 is lower than the ground level, so that the voltage difference between the first terminal U1 and the second terminal U2 is larger, and the IPMC layer deforms more.

In this phase, although the fourth switching element T4 and the eighth switching element T8 are turned on, since the third signal line SL3 outputs a low level signal, the fifth switching element T5 and the ninth switching element T9 are turned off, the second control sub-module 120 and the fourth control sub-module 140 are turned off under the control of the control line CL and the third signal line SL3 such that the level signals at the first voltage terminal V1 and the second voltage terminal V2 cannot pass the second and fourth control sub-modules to reach the first terminal U1 and the second terminal U2 of the IPMC layer of the deformation element 20.

Step S202: in the second phase P2 and the third phase P3, the control line CL outputs a low level signal, and all the control sub-modules of the control module 10 are turned off under the control of the control line CL.

Voltages of the control electrodes of the second switching element T2 and the sixth switching element T6 are pulled down forcedly, and T2 and T6 are turned off immediately, while the third switching element T3 and the seventh switch element T7 will not be cut off immediately due to the effects of the parasitic capacitance of the switching element itself, that is, before T3 and T7 are turned off, the positive high-level voltage VDD of the second voltage terminal V2 and the negative low level voltage VEE of the first voltage terminal V1 can still be outputted through the first signal line SL1 to the first terminal U1, outputted through the fourth signal line SL4 to the second terminal U2; in addition, since the first terminal U1 and the second terminal U2 are not grounded, the charge stored in the deformation element 20 will not be released immediately for the lack of a discharge passage.

Therefore, in the second phase P2 and the third phase P3, the first terminal U1 of the IPMC layer can still remain at the positive high level VDD in the first phase P1, and the second terminal U2 remains at the negative low level VEE in the first phase P1, so that the deformation element 20 still remains bending of the first phase P1 in the two phases P2 and P3.

Step S203: in the fourth phase P4, the control line CL and the third signal line SL3 outputs a high-level signal, the second control sub-module 120 and the fourth control sub-module 140 are turned on under the control of the control line CL and the third control signal line SL3; the fourth switching element T4, the fifth switching element T5, the eighth switching element T8 and the ninth switching element T9 are turned on, the positive high level voltage VDD provided by the second voltage terminal V2 is outputted through the fourth signal line SL4 to the second terminal U2 of the IPMC layer, the negative low level voltage VEE provided by the first voltage terminal V1 is outputted through the first signal line SL1 to the first terminal U1 of the IPMC layer, the IPMC layer deforms in a reverse direction under the control of the negative low level voltage VEE provided by the first voltage terminal V1 and the positive high level voltage VDD provided by the second voltage terminal V2, and bends toward the first terminal U1; compared to the touch feedback circuit shown in FIG. 4, the positive high level of the second terminal U2 is higher than the ground level, so that the voltage difference between the first terminal U1 and the second terminal U2 is larger, and the IPMC layer deforms more.

In this phase, although the second switching element T2 and the sixth switching elements T6 are turned on, the low-level signal outputted by the second signal line SL2 turns off the third switching element T3 and the seventh switch element T7, the first control sub-module 110 and the third control sub-module 130 are turned off under the control of the control line CL and the second signal line SL2, so that the levels of the first voltage terminal V1 and the second voltage terminal V2 will not reach the first terminal U1 and the second terminal U2 of the IPMC layer of the deformation element 20 through the first and third control sub-modules.

Step S204: in the fifth phase P5 and the sixth phase P6, the control line CL outputs a low level signal, and all the control sub-modules of the control module 10 are turned off under the control of the control line CL.

After the control line CL outputs the low level signal, the voltages of the control electrodes of the fourth switching element T4 and the eighth switching element T8 are pulled down forcedly so that T4 and T8 are cut off immediately, but the fifth switching element T5 and the ninth switching element T9 will not be turned off immediately due to the effects of the parasitic capacitance of the switching elements themselves, that is, before T5 and T9 are not turned off, the positive high level voltage VDD of the second voltage terminal V2 and the negative low level voltage VEE of the first voltage terminal V1 may still be outputted through the fourth signal line SL4, respectively, to the second terminal U2, and outputted to the first terminal U1 through the first signal line SL1; in addition, since the first terminal U1 and the second terminal U2 are not grounded, the charge stored in the deformation element 20 will not be discharged immediately for the lack of the discharge passage.

Therefore, in the fifth phase P5 and the sixth phase P6, the first terminal U1 of the IPMC layer still remains at the negative low level VEE in the fourth phase P4, the second terminal U2 remains at the positive high level VDD in the fourth stage P4, so that the deformation element 20 still remains bending of the fourth phase P4 in the two stages P5 and P6.

Step S205: repeating the above steps S201-S204.

In the disclosed embodiment, the absolute values of the positive high level voltage VDD provided by the second voltage terminal V2 and the negative low level voltage VEE provided by the first voltage terminal V1 may be equal or unequal, such as VEE=−VDD.

In order to make the deformation element 20 deforms significantly, it could be chosen in the embodiment of the present disclosure that the absolute values of VDD and VEE are not less than 20V, for example, VDD is 25V, and VEE is −25V.

Based on the above description, according to the touch feedback circuit of the further embodiment of the present disclosure in the second phase P2, the third phase P3, and the fifth phase P5 and the sixth phase P6, the absolute value of the voltage difference between the first terminal U1 and the second terminal U2 of the IPMC layer of the deformation element 20 remains unchanged, whereby the duration of deformation feedback lasts longer. Further, since when the deformation element 20 deforms, it bends from one side to the other side directly, without restoring to the initial undeformed state, and therefore the degree of the deformation feedback is larger, allowing users to get more intense and lasting touch feedback experience.

Figure 9:
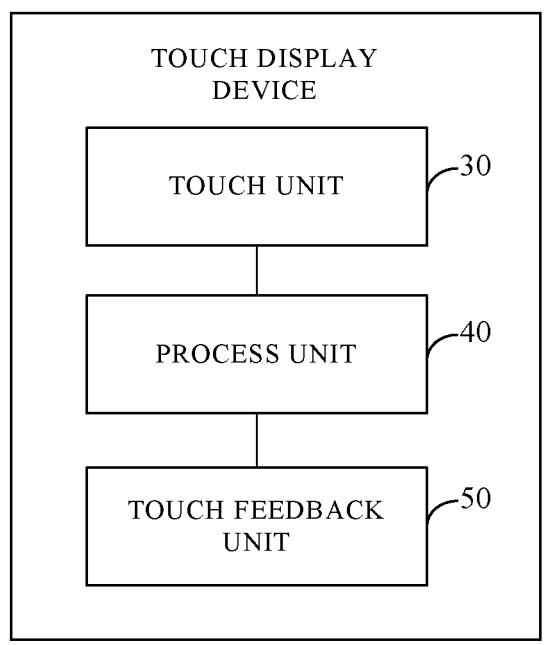
FIG. 9 is an exemplary block diagram of a touch display device according to the embodiment of the present disclosure.

FIG. 9 is an exemplary block diagram of a touch display device according to the embodiment of the present disclosure. The touch display device comprises a touch unit 30, a processing unit 40 connected to the touch unit 30 and a touch feedback unit 50 connected to the processing unit 40, wherein the processing unit 40 is configured to determine the touch position according to information transmitted by the touch unit 30, and the touch feedback unit 50 is configured to perform touch feedback according to the touch position determined by the processing unit 40. The touch feedback unit 50 includes the above-described touch feedback circuit. When the user touches the display, the touch feedback unit of the touch display device may deform at the touch position, thereby bringing users touch feedback experience.

In an embodiment of the present disclosure, a variety of methods can be used to determine the touch position. By example of capacitive touch display, when a user touches the display, human body electric field causes the user and the metal conductive layer on the surface of the display to form a coupling capacitor, and the capacitor can be considered as a direct conductor for high-frequency current, whereby the human body will draw a very small current from the contact point. The touch position can be determined by detecting the small current change by a detection circuit. By example of pressure touch display, when the user touches the display, the finger and the metal conductive layer on the surface of the display form a capacitor, and the touch position may be determined according to the waveform change of the capacitor (i.e., the rising edge and falling edge of the waveform are changing as the finger touches).

The touch display device further includes a display unit arranged in each sub-pixel, and the touch feedback circuit is arranged in each sub-pixel. Since each sub-pixel is provided with a touch feedback circuit therein, touching anywhere on the display device can make the corresponding deformation element 20 deform, whereby the touch display device can bring users touch feedback experience anywhere the user touches.

In all embodiments of the present disclosure, the high-level signal or low-level signal outputted by each signal line or control line is used for each signal line or control line itself, not comparable to each other. For the control line CL, choosing the outputted high-level signal to turn on the switching element coupled thereto, and choosing the outputted low level signal to turn off the switching element coupled thereto; for the first signal line SL1 in FIGS. 2 and 4 and the second signal line SL2 and the third signal line SL3 in FIGS. 6 and 7, choosing the outputted high-level signal to turn on the switching element controlled by them, and choosing the outputted low level signal to turn off the switching element controlled by them; for the first terminal voltage V1 and the second terminal voltage V2, the outputted voltage is chosen to correspond to the deformation required by the deformation element 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A touch feedback circuit comprising:
   a deformation element having a first terminal and a second terminal;
   at least one control module comprising a first control sub-module, a second control sub-module, a third control sub-module and a fourth control sub-module;
   a control line;
   a first signal line, a second signal line, a third signal line, and a fourth signal line; and
   a first voltage terminal and a second voltage terminal, wherein:
   the first signal line and the fourth signal line are connected between the first control sub-module and the fourth control sub-module and are connected to the second voltage terminal, and the first signal line and the fourth signal line are connected between the second control sub-module and the third control sub-module and are connected to the first voltage terminal;
   the first control sub-module is connected to the control line, the first signal line, the second signal line and the first terminal of the deformation element, and is configured to output a signal of the second voltage terminal to the first terminal of the deformation element through the first signal line under the control of the control line and the second signal line;
   the second control sub-module is connected to the control line, the first signal line, the third signal line and the first terminal of the deformation element, and is configured to output a signal of the first voltage terminal to the first terminal of the deformation element through the first signal line under the control of the control line and the third signal line;
   the third control sub-module is connected to the control line, the fourth signal line, the second signal line and the second terminal of the deformation element, and is configured to output the signal of the first voltage terminal to the second terminal of the deformation element through the fourth signal line under the control of the control line and the second signal line; and
   the fourth control sub-module is connected to the control line, the fourth signal line, the third signal line and the second terminal of the deformation element, and is configured to output the signal of the second voltage terminal to the second terminal of the deformation element through the fourth signal line under the control of the control line and the third signal line.

2. The touch feedback circuit according to claim 1, wherein the deformation element comprises an ionic polymer metal composite (IPMC) layer.

3. The touch feedback circuit according to claim 1, wherein the first control sub-module comprises a second switching element and a third switching element;
   wherein a control electrode of the second switching element is coupled to the control line, a first electrode of the second switching element is coupled to the second signal line, and a second electrode of the second switching element is coupled to a control electrode of the third switching element; and
   wherein a first electrode of the third switching element is coupled to the first signal line, and a second electrode of the third switching element is coupled to the first terminal of the deformation element.

4. The touch feedback circuit according to claim 1, wherein the second control sub-module comprises a fourth switching element and a fifth switching element;
   wherein a control electrode of the fourth switching element is coupled to the control line, a first electrode of the fourth switching element is coupled to the third signal line, and a second electrode of the fourth switching element is coupled to a control electrode of the fifth switching element; and
   wherein a first electrode of the fifth switching element is coupled to the first signal line, and a second electrode of the fifth switching element is coupled to the first terminal of the deformation element.

5. The touch feedback circuit according to claim 1, wherein the third control sub-module comprises a sixth switching element and a seventh switch element;
   wherein a control electrode of the sixth switching element is coupled to the control line, a first electrode of the sixth switching element is coupled to the second signal line, and a second electrode of the sixth switching element is coupled to a control electrode of the seventh switching element; and
   wherein a first electrode of the seventh switch element is coupled to the fourth signal line, and a second electrode of the seventh switching element is coupled to a second terminal of the deformation element.

6. The touch feedback circuit according to claim 1, wherein the fourth control sub-module includes an eighth switching element and a ninth switching element;

wherein a control electrode of the eighth switching element is coupled to the control line, a first electrode of the eighth switching element is coupled to the third signal line, and a second electrode of the eighth switching element is coupled to a control electrode of the ninth switching element; and wherein a first electrode of the ninth switch element is coupled to the fourth signal line, and a second electrode of the ninth switching element is coupled to a second terminal of the deformation element.

7. A touch feedback unit comprising the touch feedback circuit according to claim 1.

8. A touch display device comprising the touch feedback unit according to claim 7, the touch display device further comprising a touch unit and a processing unit, wherein the processing unit is connected to the touch unit, and is configured to determine a touch position based on information transmitted by the touch unit, and wherein the touch feedback unit is connected to the processing unit, and is configured to perform touch feedback according to the touch position determined by the processing unit.

9. The touch display device according to claim 8, further comprising a display unit arranged in each of multiple sub-pixels, wherein the touch feedback circuit is arranged in each sub-pixel.

10. A method for driving the touch feedback circuit according to claim 1, comprising:

outputting, by the control module, signals provided by the first voltage terminal and the second voltage terminal to the first terminal and the second terminal of the deformation element, respectively, under the control of the control line, the second signal line and the third signal line; and deforming the deformation element under the control of the control module, the first voltage terminal and the second voltage terminal;

wherein the control line, the second signal line and the third signal line control the deformation element corresponding to a determined touch position; and wherein the first voltage terminal and the second voltage terminal are at different levels.

11. The method according to claim 10, further comprising:

turning on the first control sub-module under the control of the control line and the second signal line, outputting by the first control sub-module a signal of the second voltage terminal to a first terminal of the deformation element through the first signal line, turning on the third control sub-module under the control of the control line and the second signal line, outputting by the third control sub-module a signal of the first voltage terminal to a second voltage terminal of the deformation element through the fourth signal line, turning off the second control sub-module and the fourth control sub-module under the control of the control line and the third signal line, and deforming the deformation element under the control of the control module, the first voltage terminal and the second voltage terminal;

turning off the first, second, third and fourth control sub-modules of the control module under the control of the control line;

turning on the second control sub-module under the control of the control line and the third signal line, outputting by the second control sub-module a signal of the first voltage terminal to the first terminal of the deformation element through the first signal line, turning on the fourth control sub-module under the control of the control line and the third signal line, outputting by the fourth control sub-module a signal of the second voltage terminal to the second terminal of the deformation element through the fourth signal line, turning off the first control sub-module and the third control sub-module under the control of the control line and the first signal line, and deforming the deformation element under the control of the control module, the first voltage terminal and the second voltage terminal; and turning off the first, second, third and fourth control sub-modules of the control module under the control of the control line.

* * * * *